US009654753B1

(12) United States Patent
Balasubramaniam

(10) Patent No.: US 9,654,753 B1
(45) Date of Patent: May 16, 2017

(54) VIDEO STREAM PROCESSING

(71) Applicant: Amazon Technologies, Inc., Seattle, WA (US)

(72) Inventor: Anantha Venkateshwaran Balasubramaniam, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/842,757

(22) Filed: Sep. 1, 2015

(51) Int. Cl.
 *G06T 1/20* (2006.01)
 *H04N 9/67* (2006.01)

(52) U.S. Cl.
 CPC ....... *H04N 9/67* (2013.01); *G06T 1/20* (2013.01)

(58) Field of Classification Search
 USPC ......................................................... 345/428
 See application file for complete search history.

(56) References Cited

U.S. PATENT DOCUMENTS

| | | | | |
|---|---|---|---|---|
| 6,373,489 B1* | 4/2002 | Lu | ..................... | G06F 17/30893 345/419 |
| 2011/0072236 A1* | 3/2011 | Mimar | ................. | G06F 9/3001 712/4 |
| 2013/0235050 A1* | 9/2013 | Karras | ....................... | G06T 1/20 345/505 |
| 2015/0022538 A1* | 1/2015 | Munshi | ................ | G06F 9/5027 345/522 |
| 2015/0067008 A1* | 3/2015 | Kamath | ................. | G06F 17/18 708/202 |

OTHER PUBLICATIONS

Abdullah Cavusoglu "Cropped Quad-Tree Based Solid Object Coloring with CUDA", published 2013.*
Patent CN 105163128A filed Aug. 31, 2015; English translation.*
Khronos™ Group, "The Open Standard for Parallel Programming of Heterogeneous Systems," https://www.khronos.org/opencl/> [retrieved Sep. 1, 2015], 5 pages.
Microsoft™, "Working with 16-Bit RGB," <https://msdn.microsoft.com/en-us/library/windows/desktop/dd390989%28v=vs.85%29.aspx> [retrieved Sep. 1, 2015], 2 pages.
Wikipedia, "Quadtree," Definition, <https://en.wikipedia.org/wiki/Quadtree> [retrieved Sep. 1, 2015], 7 pages.
Wikipedia, "YUV," Definition, <https://en.wikipedia.org/wiki/YUV> [retrieved Sep. 1, 2015], 9 pages.

* cited by examiner

*Primary Examiner* — Kimbinh T Nguyen
(74) *Attorney, Agent, or Firm* — Davis Wright Tremaine LLP

(57) ABSTRACT

A computer system encodes video display information using parallel processing capabilities of a general-purpose CPU. A driver on the computer system captures the display information into memory and identifies regions of the display that have changed. The identified changed regions are represented in a tree structure which allows the system to identify regions of the display that can be efficiently processed. The identified regions are converted from an RGB color space to a YUV420 color space using a cross-platform parallel processing framework such as OpenCL. By using a cross-platform parallel processing framework, the system is able to utilize parallel processing capabilities of the general-purpose CPU such as SSE or AVX to accelerate the conversion operation.

23 Claims, 11 Drawing Sheets

VIDEO STREAM PROCESSING

BACKGROUND

The encoding and transmission of video streams over computer networks is a difficult and important problem. High-definition and high frame rate video content can consume large amounts of network bandwidth when transmitted over computer networks. When received and processed by a recipient, large amounts of processing power may be required to decode and display the received video. The high demands of transmitting and processing video streams constrains the use of high-quality video on many devices such as mobile devices which may have limited network bandwidth and/or limited processing power. Some devices include a graphics processing unit ("GPU") that provides dedicated video processing capabilities, but many devices still lack such specialized hardware due to cost, space, or power constraints.

One environment in which the challenges related to video processing are particularly prevalent is a remotely-hosted virtual-machine environment. In a remotely-hosted virtual-machine environment, a large number of virtual machines can be hosted on a hardware platform that does not include a physical GPU for each hosted virtual machine. A remotely hosted virtual machine can export video to a remote display, but without access to a physical GPU, the virtual machine encodes the outgoing video with general purpose processing resources. Excessive use of general purpose processing resources for video stream processing can have an adverse effect on the execution of user processes, applications, and overall system responsiveness.

BRIEF DESCRIPTION OF THE DRAWINGS

Various techniques will be described with reference to the drawings, in which.

DETAILED DESCRIPTION

Figure 1:
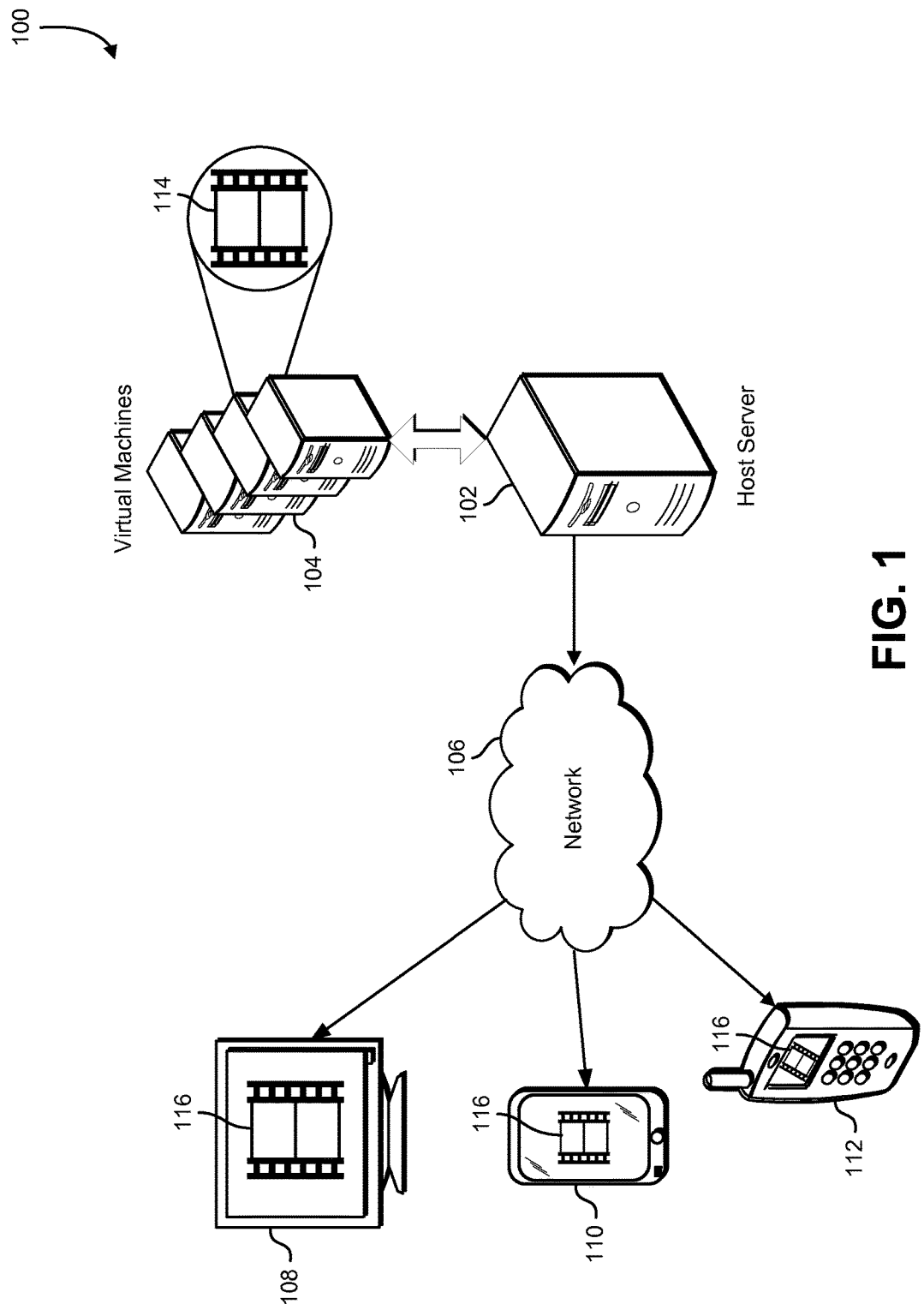
FIG. 1 shows an illustrative example of an environment in which various embodiments may be practiced.

Techniques described and suggested in the current document include systems and methods that encode video display information on computer systems, such as those having limited graphics processing capabilities. In one example, BGR(A) display information on a virtual machine is captured using a display capture component such as a video driver. BGR(A), RGB, RGB(A) are color spaces that include red, green, and blue components within a data structure. The ordering and bit width of the various components may vary. For example, B5G5R5 uses 5 bits for each color component. The display information can be captured at a variety of resolutions such as 640×480, 1024×768, and 1920×1080 and a variety of color depths such as 8, 16, 24, or 32 bits per pixel ("bpp"). In certain implementations, display information having 16 or 32 bpp color depths has an advantage of being accessible with aligned memory access. The display capture component allows a set of host components running on the computer system to access memory containing the display information, and also provides notifications that identify portions of the display image that have changed from a previous video frame. One possible component that may be used as a display capture component is a mirror driver. Generally speaking, a mirror driver is a display driver that acts as a driver for a virtual graphics card. The mirror driver receives notification of display screen updates, and can provide access to video driver framebuffer memory. Using a quadtree structure, the host components process the update notifications from the display capture component to identify regions of the display image that can be efficiently processed, while excluding display regions from processing that have not changed. The identified set of regions is processed using a cross-platform parallel processing framework such as OpenCL, Accelerated Massive Parallelism ("AMP"), or Compute Unified Device Architecture ("CUDA"). The framework converts the portions of the image that are associated with the set of regions from the BGR(A) color space to YUV420, and combines the result with previous display frames to complete a conversion of the current display frame. In various environments that do not have access to a GPU, OpenCL-conformant frameworks can be used to generate an executable kernel that utilizes parallel processing instructions sets supported by general purpose CPUs such as Streaming SIMD(Single-instruction-multiple-data ("SIMD")) Extensions ("SSE") or Advanced Vector Extensions ("AVX") to convert the BGR(A) display information into YUV420. By carefully identifying regions containing changed display information, and by using a parallel processing framework, the above method can provide resource-efficient encoding of video display information for mobile devices, virtual machines, and other systems that may not have access to GPU resources.

The quadtree is used by the system to track regions of the display image that have changed, and to identify a set of regions that can be efficiently processed by an OpenCL kernel. A quadtree is a tree data structure where each internal node of the tree has 4 child nodes. In various implementations of the system, the quadtree is created with a fixed depth which is determined based at least in part on the resolution of the display and the performance properties of the processing hardware that is available to the OpenCL kernel. Each node of the quadtree represents a rectangular region of the display screen, and each successive level of the quadtree divides the rectangular region represented by the parent node into four quadrants. For example, the root node of the quadtree represents the entire display screen. The four child nodes of the root node of the quadtree represent four quadrants of the display screen. The next level of the quadtree divides each quadrant into four sub-quadrants, for a total of 16 sub-quadrants.

When the display capture component provides updated display information, an update handler in the set of host components is notified that particular regions of the display screen have been updated. The update handler uses the quadtree data structure to coalesce the updated regions of the display into an efficient set of regions that can be efficiently processed. In one implementation, the nodes of the quadtree are initialized to zero. The leaf nodes of the quadtree that are associated with each updated region of the display screen are updated to a value of 1 to indicate that the associated region of the display screen has changed. A changed but unprocessed region of the display screen is called a 'dirty' region. The values of the leaf nodes of the quadtree are propagated upward from the leaf nodes to the root node by adding the values of the child nodes and assigning the sum of the values to the associated parent node. For example, if the four child nodes of the parent represent four regions of the display screen that have been changed, the parent node receives a value of 4. If only two of the four child nodes represent regions of the display screen that have changed, the parent receives a value of 2.

The quadtree can be used to identify a region of the display screen that can be efficiently processed. In some examples, the system uses the quadtree to identify a region of the display screen that can be efficiently processed by determining the particular node of the quadtree that is closest to the root node, where all descendant leaf nodes of the particular node are marked as dirty. In another example, the system uses the quadtree to identify the largest region that is represented by the quadtree, where a minimum threshold percentage of child nodes are dirty. After the system processes the identified region, the system updates the quadtree data structure to reflect that the identified region is no longer dirty. After the quadtree is updated, the updated quadtree is used to identify a new region for processing. If the quadtree indicates that the entire display screen is up-to-date, processing of the display screen is complete.

In various examples, the system uses a cross-platform parallel processing framework to efficiently process regions of the display screen as they are identified for processing. In one embodiment, the system launches an OpenCL kernel to convert the identified regions of the display screen from an RGB color space to a YUV420 color space. The OpenCL kernel is able to utilize specialized parallel-processing instruction sets that are available to the particular installation of the host components. For example, on an Intel-based system, the OpenCL kernel is able to use SSE and AVX hardware to accelerate the converting operations. In another example, the OpenCL kernel is able to use a GPU to accelerate the conversion operations. In some implementations, the system selects from different conversion techniques based at least in part on the size of the display region to be processed. For example, regions that are smaller than a threshold size may be processed using conversion instructions compiled from optimized C++ code, whereas larger display regions are processed by launching an executable OpenCL kernel that exploits parallel processing facilities of the CPU.

FIG. 1 shows an illustrative example of an environment in which various embodiments may be practiced. A diagram 100 shows a system that includes a host server 102. The host server 102 runs a hypervisor that hosts a number of virtual machines 104. In some implementations, the hypervisor executes directly on the host server's hardware resources. In other applications, an operating system runs on the host server 102, and the hypervisor executes on the operating system run by the host server 102. The host server 102 is connected to a network 106, such as the Internet, which provides connectivity between the virtual machines 104 and a number of display devices. The display devices can be connected to the network 106 using a variety of network interfaces such as Ethernet, WiFi, Fiber Optic, and Cellular interfaces. The display devices can include a variety of devices such as a client computer system 108, a tablet device 110, and a mobile phone 112. In some environments, a particular display device may have limited network bandwidth and limited graphics processing capability. In such environments, when transmitting a video display stream from a particular virtual machine to the particular display device, it is important to encode the video display stream in a format that can be efficiently transmitted to and decoded by the particular display device.

Each particular virtual machine of the number of virtual machines 104 runs an operating system along with client applications that generate video display information 114. A set of host components on each virtual machine captures the video display information 114, and converts the video display information 114 into a format that is efficient for streaming to the display devices. Converted video display information 116 is transmitted from each virtual machine through a virtual network interface, through a physical network interface on the host server 102, and over the network 106 to a display device. When the display device receives the converted video display information 116, the display device decodes and displays the converted video display information 116 on a display on the display device. In some examples, the video display information 114 is generated by each virtual machine in a BRG(A) format and converted into the YUV420 color space. The YUV420 color space is adapted to the capabilities of human visual perception, and in many examples, encoding the video display information into YUV420 reduces the use of network bandwidth and reduces the impact of errors or artifacts in the video stream. If specialized graphical processing units are not available for encoding the video display information 114, it is important to convert the video display information efficiently so that the impact on the general-purpose processing resources is reduced. For example, efficient conversion of the video display information 114 can be particularly important when converting the video display information generated by lightweight virtual machines such as the virtual machines 104, or when the virtual machines 104 do not have access to graphics processing units.

In various examples, the systems and methods described in the current document convert video display information by identifying changed regions of the display screen that can be efficiently converted, and converting the identified regions by using parallel-processing capabilities of a CPU. The video display information is generated by a source computer system and captured by a display capture component. The display capture component provides access to video display memory on the source computer system that contains source video display information, and notifies various host components when regions of the source video display screen have changed. Changed regions of the video display screen are analyzed by the host components using a quadtree structure. The quadtree structure is used to identify changed regions of the video display which can be efficiently converted. In some implementations, the quadtree structure is used to identify the largest rectangular region that contains a threshold percentage of changed sub-regions.

In some implementations, the identified changed regions are converted from BRG(A) to YUV420 by a set of host components using a parallel-processing framework to generate code that is adapted to the particular parallel-processing capabilities of a host computer system. In one implementation, an OpenCL compiler is used to compile source code into intermediate code called an OpenCL kernel. The intermediate code (or kernel) is executed using an OpenCL runtime. The OpenCL runtime produces and executes instructions that are adapted to utilize parallel-processing instruction sets such as SSE or AVX that are supported by the CPU of the host computer system. The OpenCL source code can be compiled into a kernel using the OpenCL compiler when the host components are installed, when the host components are initialized for use, or when the source video display information is converted. In some implementations, the OpenCL compiler is used to precompile a kernel from OpenCL source code. In additional implementations, other parallel-processing frameworks such as CUDA may be used to generate code which converts changed regions of the source video display.

As the identified regions are converted from BRG(A) to YUV420, the host components updates the quadtree structure and additional regions are identified and converted. When all of the changed regions of the display screen have been converted, the host components transmit the encoded display screen frame over the network to a display device.

Figure 2:
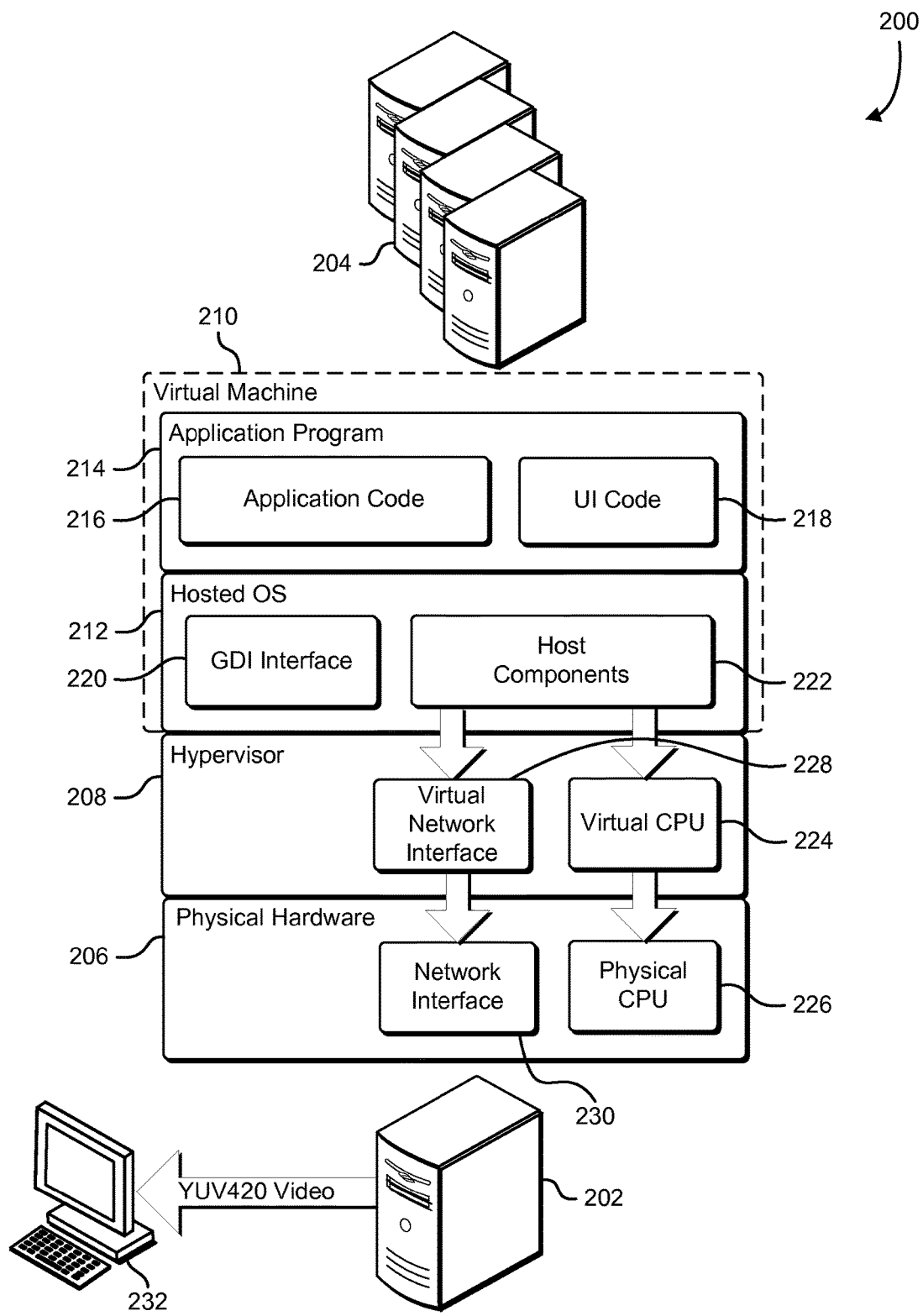
FIG. 2 shows an illustrative example of a system that encodes video display information that is generated on a virtual machine running on a hypervisor, in accordance with an embodiment.

FIG. 2 shows an illustrative example of a system that encodes video display information that is generated on a virtual machine running on a hypervisor, in accordance with an embodiment. A diagram 200 shows a set of modules installed on a host computer system 202 that includes a number of virtual machines 204. The host computer system 202 has a physical hardware layer 206. The hypervisor 208 executes on top of the physical hardware layer 206 and provides a virtual execution environment for the virtual machines 204. Each virtual machine of the virtual machines 204 runs a virtual-machine module stack 210.

The virtual-machine module stack 210 includes a hosted OS 212 that runs within the virtual execution environment provided by the hypervisor 208. The hosted OS 212 supports an application program 214. The application program 214 is a user-mode program that includes executable application code 216 and user interface ("UI") code 218. The application code 216 includes code that, when executed, performs general business logic functions. The UI code 218 includes code that, when executed, causes the generation of graphical elements, animations, and other visual user interface content. The visual interface content can be generated by calling a graphics device interface ("GDI") 220 within the hosted OS 212. In some examples, other graphical APIs may be substituted for the graphics device interface 220 such as Windows GDI, the XWindows API, or DirectX. A collection of host components 222 captures a stream of video display information generated by the hosted OS 212 in BGR(A) format. The collection of host components 222 converts the captured display information from BGR(A) format into the YUV420 color space by identifying regions of the display screen that have changed, and converting those identified regions into the YUV420 color space.

The host components 222 utilize a parallel-processing framework to generate and execute instructions that exploit parallel-processing instruction sets when converting display information. The hypervisor 208 provides the collection of host components with access to a virtualized CPU 224. The virtualized CPU 224 provides access to parallel-processing instruction sets that are supported by a physical CPU 226 in the physical hardware layer 206. In some virtual-machine environments, parallel-processing instructions are passed through the virtualized CPU 224 to the physical CPU 226, resulting in substantial performance improvements. After the video display information is converted, the converted video display information is transmitted by the set of host components 222 to a display device 232 using a virtual network interface 228 that provides access to a physical network interface 230.

Figure 3:
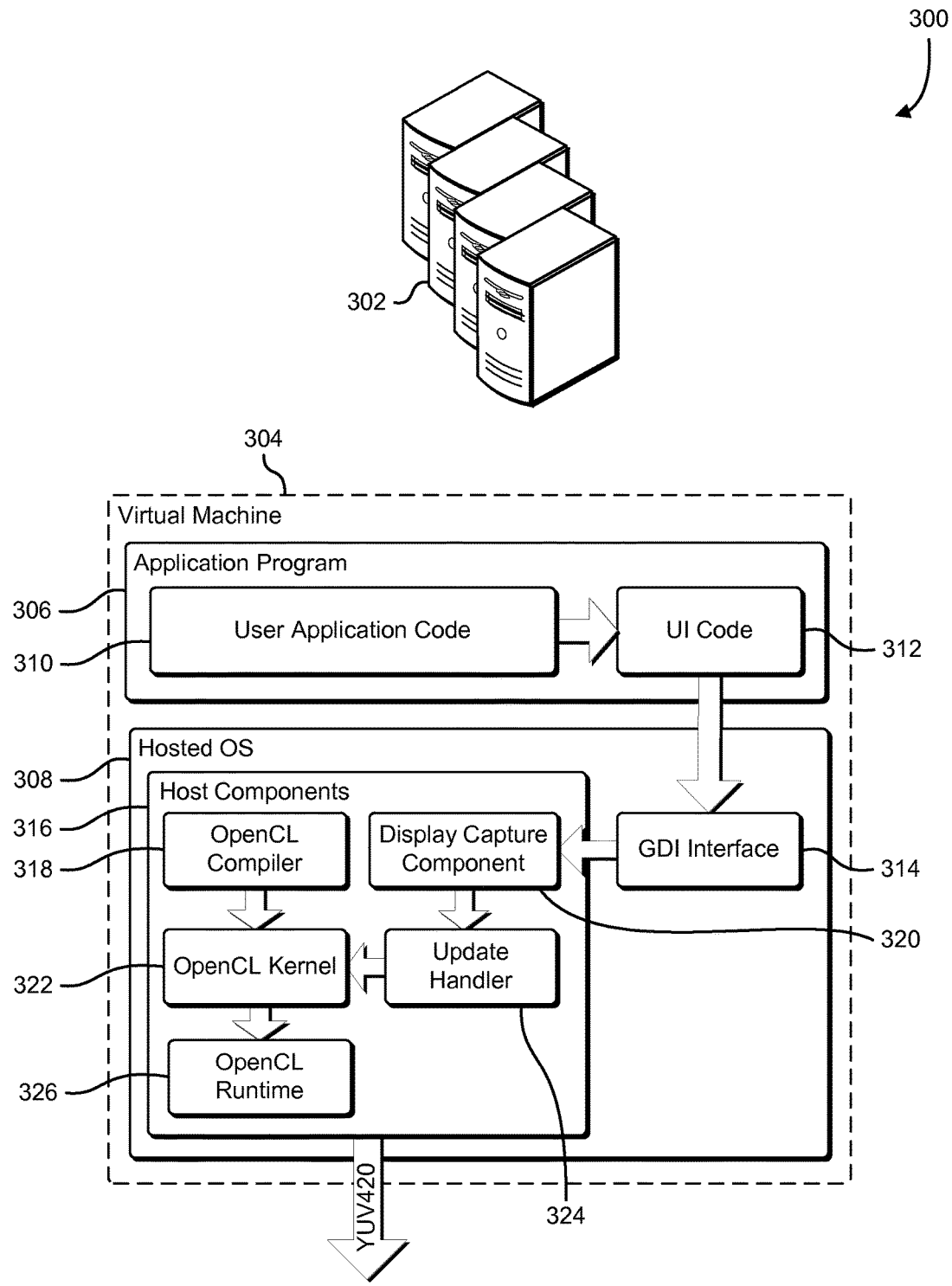
FIG. 3 shows an illustrative example of a virtual machine that includes a set of host components for encoding video display information, in accordance with an embodiment.

FIG. 3 shows an illustrative example of a virtual machine that includes a set of host components for encoding video display information, in accordance with an embodiment. A diagram 300 shows a collection of virtual machines 302. Each virtual machine of the collection of virtual machines 302 has a virtual machine environment 304. The virtual machine environment 304 includes an application program 306 and a hosted OS 308. The application program 306 includes user application code 310 and UI code 312. The user application code includes instructions that, when executed, perform business functions or other operations in furtherance of the objective of the application program 306. The UI code 312 includes instructions that, when executed, cause visual elements to be animated on a graphical device. For example, in some implementations the UI code 312 provides instructions that, when executed, present a graphical user interface on a computer monitor. The UI code 312 includes calls to a GDI interface 314. The GDI interface 314 is an application programming interface ("API") provided by the hosted OS 308 that provides functions to animate graphical elements on a display device.

The virtual machine environment 304 includes a set of host components 316 that run on the hosted OS 308. The set of host components 316 includes an OpenCL compiler 318, a display capture component 320, an OpenCL kernel 322, an update handler 324, and an OpenCL runtime 326. The display capture component 320 is a display driver for the hosted OS 308 that provides access to video display memory, and also provides notifications of changes to the video display. In some examples, the display capture component is a user-mode component such as a mirror driver, the Windows Desktop Duplication API, or component with similar functionality. The update handler 324 is a module of executable instructions that, when executed, process change notifications and video display information provided by the display capture component and identify particular regions of the video display screen that have changed, and which can be efficiently converted from one format to another using parallel processing techniques implemented by the host components 316.

The host components 316 include a number of parallel processing components that generate and execute instructions that utilize specialized parallel-processing instruction sets provided by many general-purpose CPUs. For example, various Intel CPUs provide parallel-processing instruction sets such as SSE and AVX instruction sets, and AMD CPUs provide parallel-processing instruction sets such as SSE, XOP, FMA4, and CVT16. The production and maintenance of parallel-processing code can be difficult due to the variety of parallel-processing instruction sets that are available. As a result, various commercially available cross-platform parallel-processing frameworks are available that are capable of generating executable instructions adapted to the particular execution environment. OpenCL is a particular cross-platform parallel-processing framework used in various examples described in the present document, however other parallel-processing frameworks such as CUDA may be used. In some examples, parallel-processing instructions may be written without the use of a framework. In additional examples, converting can be accomplished without the use of parallel-processing instructions.

In the example shown in FIG. 3, the host components 316 include a number of parallel-processing components that operate in accordance with the OpenCL framework. An OpenCL compiler 318 is provided with OpenCL source code, and generates a module of executable instructions in an intermediate language called an OpenCL kernel 322. The OpenCL kernel 322 is executed with the assistance of an OpenCL runtime 326. The OpenCL runtime generates instructions specific to the available CPU, and may include specialized parallel-processing instructions supported by the available CPU.

When the update handler 324 identifies a region of the video display that has changed, the update handler 324 launches the OpenCL kernel 322. The OpenCL kernel 322 converts the identified region of the video display from the BGR(A) color space into the YUV420 color space. The OpenCL kernel 322 can be adapted to perform various image processing, image encoding, image decoding, and image format converting operations. For example, using appropriate OpenCL source code, the host components 316 may be adapted to convert display information from RGB, B5G6R5, or B5G5R5 formats into CMYK, YUV 444, or YUV422 formats. The update handler 324 iteratively identifies changed regions of the video display for processing, and submits the identified changed regions to the OpenCL kernel 322 to be converted. When the changed regions of the video display have been converted, the converted regions are combined with previously converted regions to produce a fully converted display screen. The fully converted display screen can be used for various purposes. In some implementations, the fully converted display screen is transmitted over a computer network to a remote display device. In other implementations, the fully converted display screen is recorded to disk for future screen casting.

Figure 4:
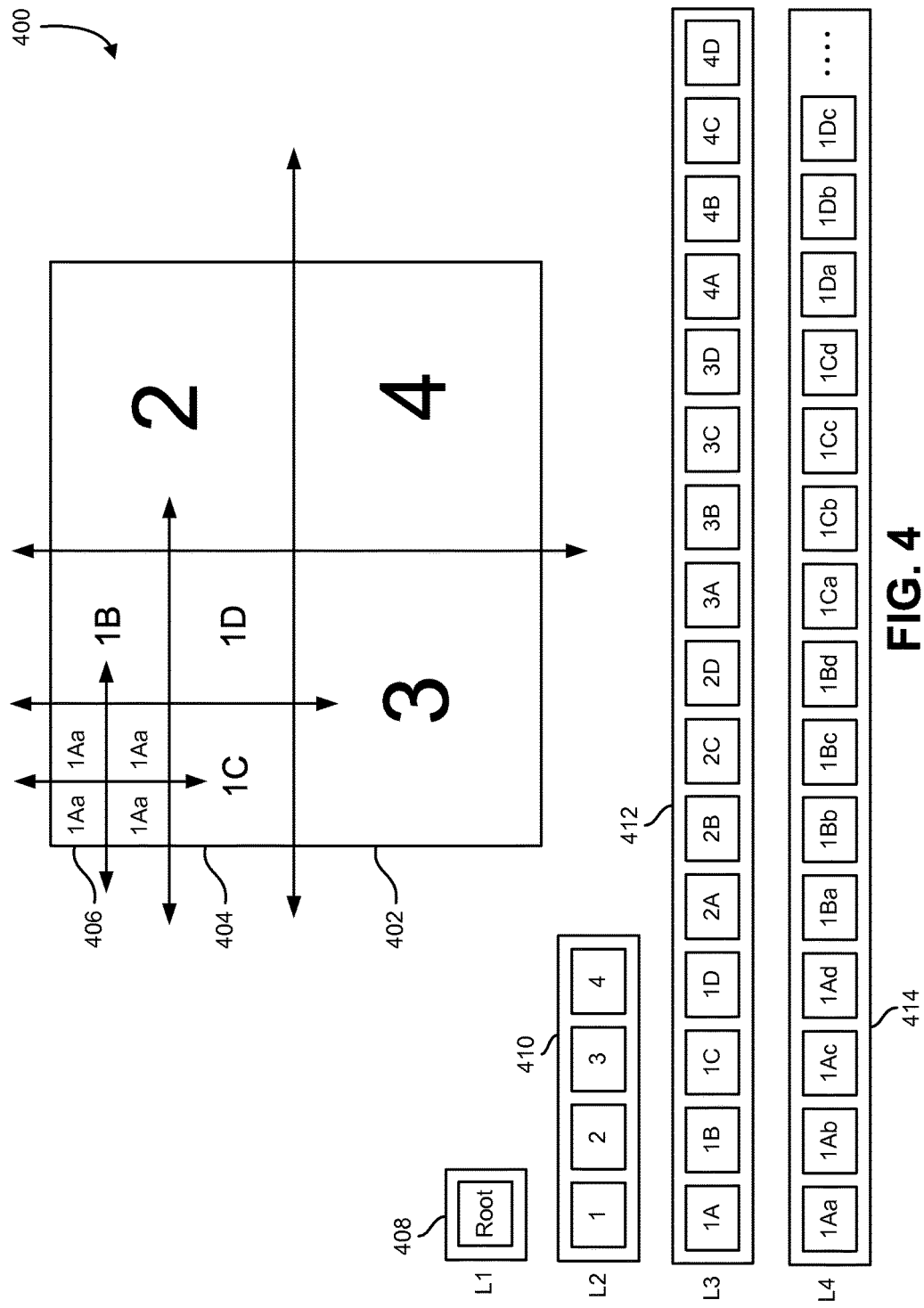
FIG. 4 shows an illustrative example of a quadtree data structure, in accordance with an embodiment.

FIG. 4 shows an illustrative example of a quadtree data structure, in accordance with an embodiment. A diagram 400 includes a graphical representation of a quadtree data structure. The quadtree data structure is used to represent regions of a display screen that have changed. An update handler processes the information in the quadtree and identifies regions of the display screen that can be efficiently converted by an OpenCL kernel. In the illustrated example, the quadtree data structure has four levels, but in additional examples the quadtree data structure can have more or fewer levels based at least in part on the size and resolution of the display screen represented by the quadtree, and the speed and overhead associated with converting a region of the display screen. The quadtree is a tree data structure where each interior node of the tree data structure has four child nodes. Each node of the quadtree contains an integer value. For a leaf node, the value of each leaf node indicates whether the region of the display screen represented by the leaf node has changed. If the region of the display represented by the leaf node has changed, the value of the leaf node is '1'. If the region of the display represented by the leaf node has not changed, the value of the leaf node is '0'. For an interior node, the value of each interior node is the sum of the values of the leaf nodes which are children, either directly or indirectly, of the interior node. For example, for an interior node that has four leaf-node children, three of which represent regions of the display screen that have changed, the value of the interior node is '3'.

The descending levels of the quadtree represent increasingly smaller regions of the display screen. The root node of the quadtree represents the entire area of the display screen. The second level of interior nodes of the quadtree each represent one of four quadrants of the display screen, such as area '3' 402. The third level of interior nodes of the quadtree represent one fourth of one quadrant of the display screen, such as area '1C' 404. The fourth level of nodes are, in this example, the leaf nodes. Each leaf node represents one quarter of a quarter quadrant of the display screen such as area '1Aa' 406.

The quadtree nodes can be stored in memory in a variety of ways. In one example, the quadtree is allocated by allocating node structures using dynamic memory allocation. Each node structure includes a value field, and four child node pointers. The child pointers reference the child nodes of each allocated node. For leaf nodes, the child pointers are zero. In another example, the quadtree is stored in a flattened array of node values. The first element of the array represents a root node 408 of the quadtree. The next four elements of the array represent a set of second level interior nodes 410. The next 16 elements of the array represent a third level of interior nodes 412. The following 64 elements hold a collection of leaf nodes 414.

The depth of the quadtree may be determined in a variety of ways. For a given display resolution and color depth, a quadtree with more levels contains more leaf nodes each of which represent smaller regions of the display screen than a quadtree with fewer levels. In some examples, the depth of the quadtree is retrieved from the table where the table contains quadtree depth values for various display screen resolutions and color depth combinations. In another example, the quadtree depth is determined based at least in part on the total amount of data represented by the display screen. In yet another implementation, an OpenCL is used to acquire performance measures for the CPU that are available to the system, and the performance measures are used to determine the depth of the quadtree. In yet another implementation, the system determines an amount of overhead time associated with converting a region of the display screen, and an amount of conversion time associated with converting a region of the display screen. The system determines a minimum leaf region size for which the converting time is equal to twice the overhead time, and the quadtree tree depth is determined based at least in part on the determined minimum leaf region size.

The quadtree can be used in various ways to identify regions of a display screen that have changed which can be efficiently converted. In various implementations, regions of a display screen that can be efficiently converted are regions represented by nodes for which a threshold fraction of child nodes have also changed. In one example, a region that is represented by an interior node can be efficiently converted when all child nodes of the interior node represent regions of the display screen that have changed. In another example, a region that is represented by an interior node can be efficiently converted when a threshold percentage of child nodes of the interior node represent regions of the display screen that have changed. In some implementations, in order to reduce the overhead of executing the OpenCL kernel, the system attempts to identify the largest regions that can be efficiently converted, before converting smaller regions.

In some embodiments dirty regions of a display screen can be represented using tree structures having different numbers of child nodes for each interior node. In various implementations, the number of child nodes of each interior node is a perfect square. For example, in various implementations, each interior node can have 9, 16, 25, or 32 child nodes. In additional embodiments, the child nodes of the tree structure represent regions of the display that are overlapping. More than one tree structure may be used to represent synchronized video streams that present display information in three dimensions. For example, a first tree structure can be used to represent a left-eye image, and a second tree structure can be used to represent a right-eye image.

Figure 5:
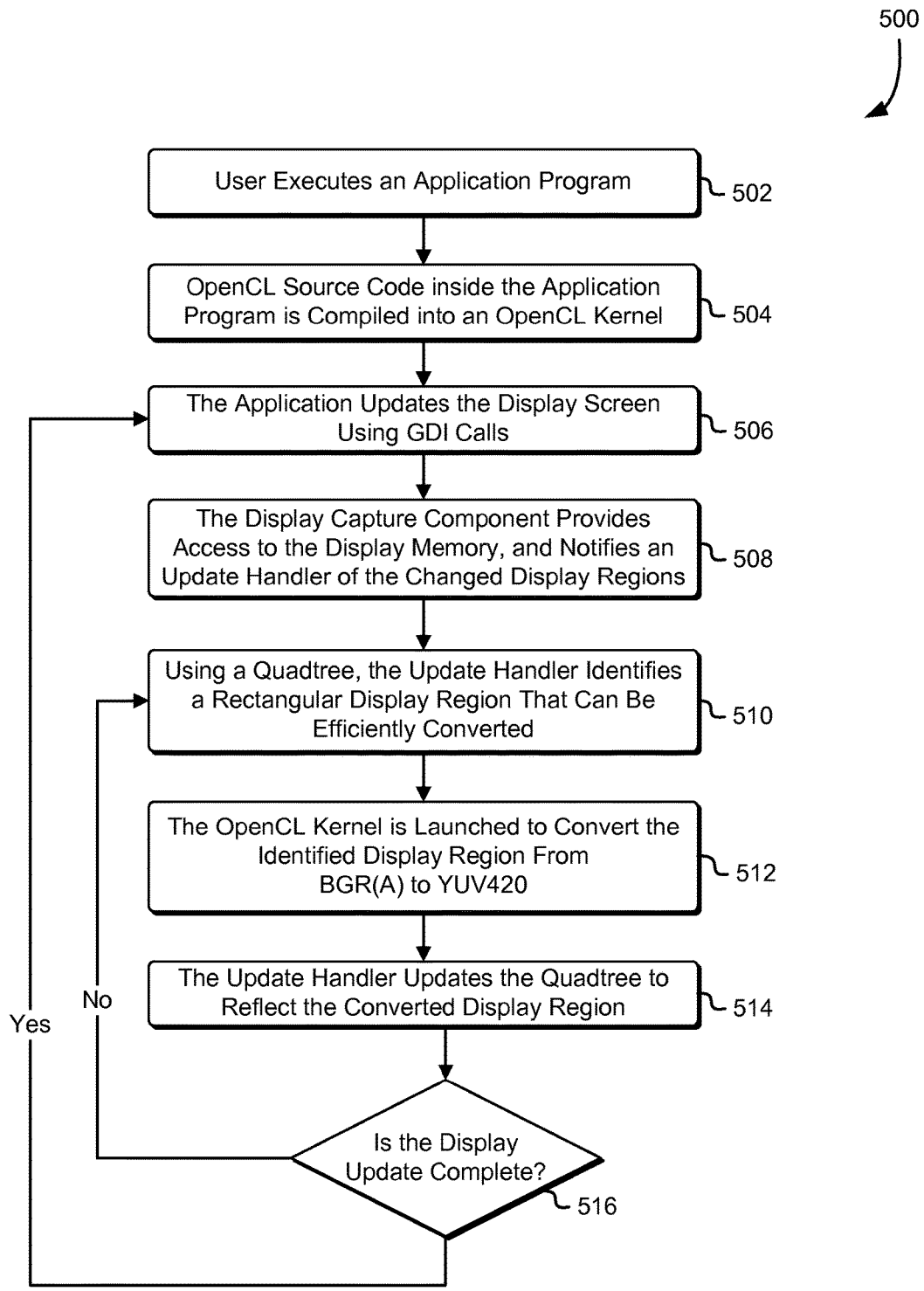
FIG. 5 shows an illustrative example of a process that, when performed by a computer system, generates video display information in a BGR(A) format, and converts the display information into a YUV420 format, in accordance with an embodiment.

FIG. 5 shows an illustrative example of a process that, when performed by a computer system, generates video display information in a BGR(A) format, and converts the display information into a YUV420 format, in accordance with an embodiment. A process diagram 500 shows a process that is performed by a video-display-information generating computer system. The process begins at block 502, where a user causes an application program to be executed on the computer system. The application program includes instructions that, when executed, generate a video display stream in BGR(A) format. At block 504, the application program provides OpenCL source code for converting BGR(A) image information to YUV420 information to an OpenCL compiler. The OpenCL compiler generates an OpenCL kernel that, with an OpenCL runtime, can be executed by the computer system. In some implementations, the OpenCL kernel is provided by the developer of the application in pre-compiled form, and the compilation step described in block 504 is omitted.

An example of OpenCL source code for converting RGB565 or RGB555 to YUV420 is provided below.

```
#define RGB555
int dot_ushornushort4 a, short4 b)
{
return    (int)a.x*(int)b.x+(int)a.y*(int)b.y+(int)a.z*(int)
    b.z;
}
_kernel void convert_RGB16_to_YUV420(_global ushort*rgb565, int xOffset, int yOffset, int stride, _global uchar*y, _global uchar*u, _global uchar*v)
{
//https://msdn.microsoft.com/en-us/library/windows/
    desktop/dd390989(v=vs.85).aspx #ifdef_RGB555
//Convert from packed 5-5-5 to 8-bit values
const ushort4 bMask={0x001F, 0x001F, 0x001F, 0x001F};
const ushort4 bShift={3, 3, 3, 3};
const ushort4 gMask={0x03E0, 0x03E0, 0x03E0, 0x03E0};
const ushort4 gShift={2, 2, 2, 2};
const ushort4 rMask={0x7C00, 0x7C00, 0x7C00, 0x7C00};
const ushort4 rShift={7, 7, 7, 7};
#else
//Convert from packed 5-6-5 to 8-bit values
const ushort4 bMask={0x001F, 0x001F, 0x001F, 0x001F};
const ushort4 bShift={3, 3, 3, 3};
const ushort4 gMask={0x07E0, 0x07E0, 0x07E0, 0x07E0};
const ushort4 gShift={3, 3, 3, 3};
const ushort4 rMask={0xF800, 0xF800, 0xF800, 0xF800};
const ushort4 rShift={8, 8, 8, 8};
#endif
const short4 yConv={66, 129, 25, 0};
const short4 uConv={-19, -37, 56, 0};
const short4 vConv={56, -47, -9, 0};
const int x_pos=(xOffset >>1)+get_global_id(0);
const int y_pos=(yOffset >>1)+get_global_id(1);
//Compute input/Y offset
const int offset=((y_pos*2)*stride)+(x_pos*2);
//Compute U,V offset
const int offset2=(y_pos*(stride/2))+x_pos;
//Gather
ushort4 rgbQuad={rgb565 [offset], rgb565 [offset+1], rgb565 [offset+stride], rgb565 [offset+stride+1]};
//Process 4 pixels per work-item
ushort4 r=((rgbQuad & rMask)>> rShift);
ushort4 g=((rgbQuad & gMask)>> gShift);
ushort4 b=((rgbQuad & bMask)<<bShift);
//Swizzle to get 4 R, G, B, 0 vectors
ushort4 rgb1={r.x, g.x, b.x, 0};
ushort4 rgb2={r.y, g.y, b.y, 0};
ushort4 rgb3={r.z, g.z, b.z, 0};
ushort4 rgb4={r.w, g.w, b.w, 0};
//Apply conversion
//2 Ys for top row of 2x2
int ly1=(dot_ushort(rgb1, yConv)>>8)+16;
int ly2=(dot_ushort(rgb2, yConv)>>8)+16;
//Average U, V for top row
int lu=(dot_ushort(rgb1+rgb2, uConv)>>9)+64;
int lv=(dot_ushort(rgb1+rgb2, vConv)>>9)+64;
//2 Ys for bottom row of 2x2
int ly3=(dot_ushort(rgb3, yConv)>>8)+16;
int ly4=(dot_ushort(rgb4, yConv)>>8)+16;
//Add to average U, V for bottom row
//this makes average of all 4
lu+=(dot_ushort(rgb3+rgb4, uConv)>>9)+64;
lv+=(dot_ushort(rgb3+rgb4, vConv)>>9)+64;
//Scatter
y[offset]=(uchar)ly1;
y[offset+1]=(uchar)ly2;
y[offset+stride]=(uchar)ly3;
y[offset+stride+1]=(uchar)ly4;
u[offset2]=(uchar)lu;
v[offset2]=(uchar)lv;
}
```

At block 506, the application produces video display information. In some implementations, the video display information is generated by the application calling a GDI interface such as the Windows GDI, the XWindows API, or DirectX. At block 508, a display capture component that is installed on the computer system notifies an update handler that portions of the video display screen have changed. In addition, the display capture component provides other components of the system with access to the display memory.

The update handler receives the notifications from the display capture component and processes 510 the notifications using a quadtree data structure. The quadtree data structure is used to record which regions of the display screen are changed. When the update handler receives notification from the display driver, the update handler identifies the leaf nodes that represent regions of the display screen that are affected by the notification. The affected leaf nodes are set to a value of "1" to indicate that the content of the display region represented by the affected leaf nodes has changed. After the leaf nodes have been updated, the update handler propagates the values of the leaf nodes up the quadtree to the root by setting each internal node to the sum of the internal nodes child nodes. For example, a parent node of the leaf node is set to a value of "4" if the four child nodes of the parent node each have a value of "1." The update handler identifies a region of the display screen that can be efficiently converted by examining the nodes of the quadtree by level, proceeding from the root node to the leaf nodes, and identifying the node at the highest level of the quadtree, were the identified node also indicates that the corresponding display regions represented by the child nodes of the identified node have changed. For example, for a quadtree depth of four, the entire display screen will be identified for conversion if the root node has a value of "64," then each quarter of the display screen will be identified for conversion if the respective second level interior node has a value of "16", then each quarter of a quarter of the display screen will be identified for conversion if the respective third level interior node has a value of "4," and finally each region of the display screen will be converted if the corresponding leaf node has a value of "1."

Once a display screen region has been identified for conversion, an OpenCL kernel is launched 512 that converts the identified display screen region from the BGR(A) color space to the YUV420 color space. In some implementations, a variety of techniques can be used to convert the identified display region from the BGR(A) color space to the YUV420 color space. For example, the particular technique used for the conversion can be selected based at least in part on the size of the identified screen region, the color depth of the identified screen region, or the type and speed of processor on the computer system.

At block 514, as a result of the identified display screen region having been converted, the update handler updates the information in the quadtree data structure by setting the leaf nodes of the quadtree structure that represent the regions of the display screen that have been converted to a value of "0". The changes to the values of the leaf nodes are propagated upwards to the root of the quadtree as described above. At decision block 516, the update handler examines the root node of the quadtree. If the root node of the quadtree has a value of "0", then the entire display screen has been converted and can be stored or transmitted in the YUV420 color space, and execution returns to block 506 where the application generates additional display screen updates. If the root node of the quadtree has a value other than "0", then at least some of the areas of the screen have not been converted, and execution returns to block 510 where the update handler identifies another region of the display screen that can be efficiently processed.

Figure 6:
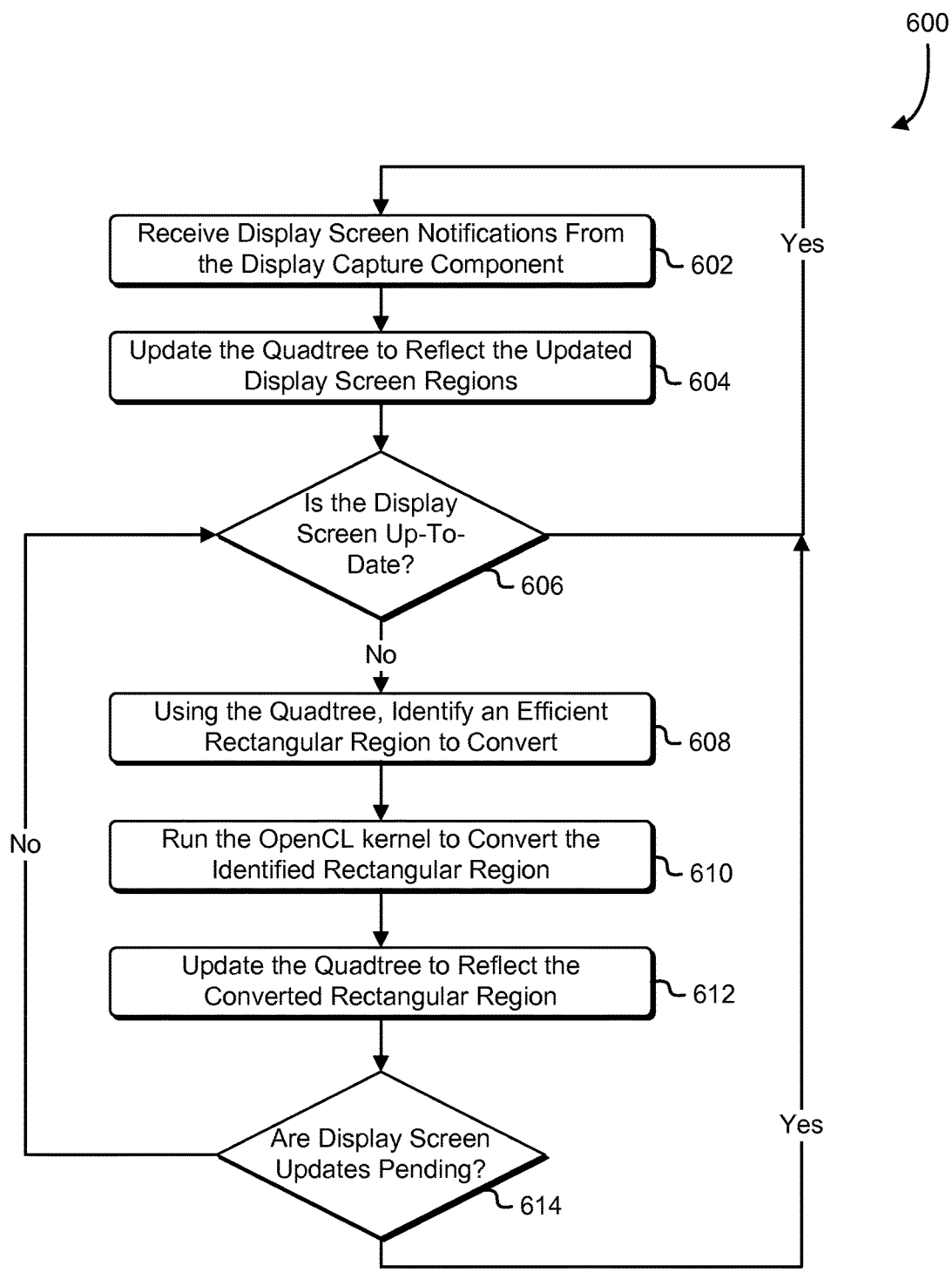
FIG. 6 shows an illustrative example of a process that, when performed by host components on a host computer system, identifies portions of a display screen that have changed and processes the changed portions of the display using a parallel processing framework, in accordance with an embodiment.

FIG. 6 shows an illustrative example of a process that, when performed by host components on a host computer system, identifies portions of a display screen that have changed and processes the changed portions of the display using a parallel processing framework, in accordance with an embodiment. A process diagram 600 shows a process that can be executed by an update handler. At block 602, an update handler receives display screen notifications from the display capture component. The display screen notifications identify particular regions of the display screen that have been changed. Using the notifications provided by the display capture component, the update handler updates 604 information stored in a quadtree data structure that indicates regions of the display screen that have changed since the previous update cycle. Leaf nodes of the quadtree structure which represent regions of the display screen that have changed are set to a value of "1", and the values of the leaf nodes are propagated upward to the root of the quadtree structure as described elsewhere in the current document.

At decision block 606 the update handler begins a loop that processes the information retained in the quadtree to identify a sequence of display screen regions that can be efficiently converted. At decision block 606, the update handler examines the root node of the quadtree to determine if the display screen has been fully converted. If the display screen has been fully converted, execution returns to block 602 where the update driver receives additional display screen updates from the display capture component. If the display screen has not been fully converted, execution advances to block 608 where the update handler uses the information retained in the quadtree to identify a region of the display screen that can be efficiently converted. Regions that can be efficiently converted may be identified using methods described elsewhere in this document, and are shown and described in FIG. 8 and the associated description.

At block 610, the update handler launches an OpenCL kernel that runs using an OpenCL runtime module. The OpenCL kernel includes instructions that include specialized parallel-processing instructions supported by the processor of the computer system. When executed, the OpenCL kernel converts the identified region of the display screen from BRG(A) to YUV420. In other implementations, properly configured OpenCL kernels may be used to encrypt, decrypt, or convert changed regions of screen displays to and from various color spaces, compressed formats, or encrypted formats. For example, the OpenCL kernel can be adapted to convert the identified region of the display screen from RGB to YUV422.

As a result of processing the identified display region with the OpenCL kernel, the update handler updates 612 the quadtree to reflect that the identified display region has been processed. The leaf nodes of the quadtree that are associated with the identified display region are set to a value of "0" to indicate that they have not been changed, and the values of the leaf nodes are propagated upward to the root of the quadtree. At decision block 614 the update handler queries the display capture component to see if additional updates to the display screen have been made by applications running on the computer system. If the display capture component has pending updates, execution returns to block 602 and the updates are retrieved from the mirror driver. If there are no pending updates from the display capture component, execution returns to decision block 606 and if the display screen has not been entirely converted, additional regions of the display screen that can be efficiently converted are identified and processed using the OpenCL kernel.

In some implementations, all changed regions recorded by the quadtree are processed with the OpenCL kernel before additional notifications are accepted from the display capture component. In such implementations, decision block 614 is structured so that if the root node of the quadtree indicates that there are additional regions of the display screen to be processed, execution returns to block 608. When the changed regions of the display screen have been processed, execution returns to block 602 and additional updates are received from the display capture component.

Figure 7:
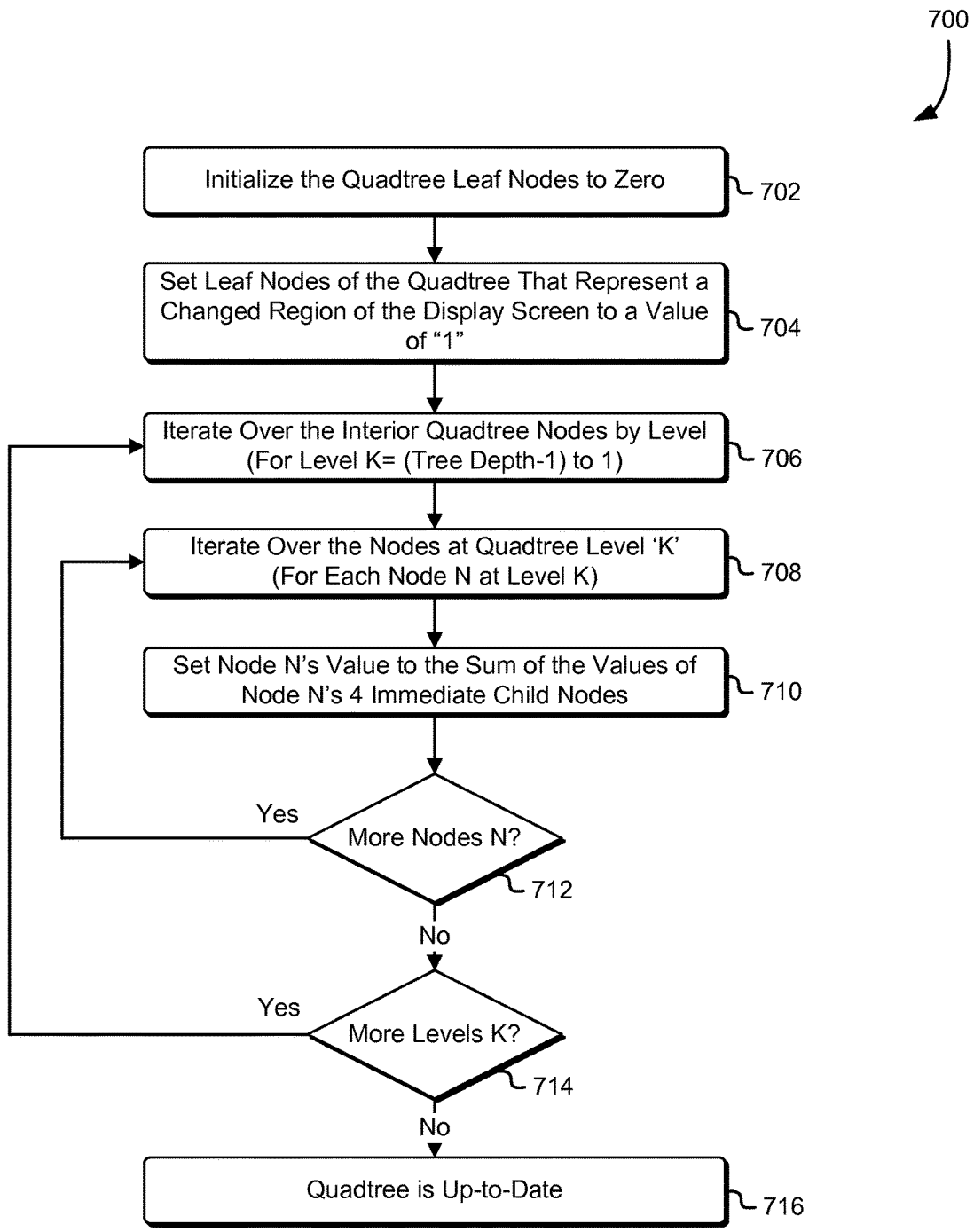
FIG. 7 shows an illustrative example of a process that, when performed by a computer system, updates a quadtree data structure so that the value of each node of the quadtree reflects the number of child nodes that represent changed display information, in accordance with an embodiment.

FIG. 7 shows an illustrative example of a process that, when performed by a computer system, updates a quadtree data structure so that the value of each node of the quadtree reflects the number of child nodes that represent changed display information, in accordance with an embodiment. A process diagram 700 shows a process that can be executed by an update handler to store display update notifications in a quadtree so that the value of each interior node in the quadtree represents the number of leaf nodes that are children of the interior node that represent display regions that are indicated as being changed. At block 702, the update handler initializes the value of all leaf nodes of the quadtree to zero. Using information received from the display capture component, the update handler identifies regions of the display screen that have changed since the previous processing of the display screen, and therefore need to be updated. The leaf nodes of the quadtree that represent the identified changed regions of the display are set to a value of "1" to indicate that the display regions represented by the leaf nodes have changed and need to be updated.

The update handler begins a loop that propagates the values of the leaf nodes up the quadtree to the root node of the quadtree. At block 706, the update handler processes interior nodes of the quadtree by level by iterating over the levels of the quadtree from the level of the leaf nodes to the level of the root node (bottom to top). The update handler decrements a loop index 'K' from a value of the quadtree depth minus one, to one. At block 708, an interior loop iterates, using a loop index 'N', over each quadtree node at the quadtree level indicated by the loop index 'K'. Using the loop index 'K' and the loop index 'N', the update handler can identify a particular interior node of the quadtree 'Node$_{KN}$' (the 'N'th node at quadtree level 'K'). Each interior node of the quadtree has four immediate child nodes. The update handler updates 710 the value of Node$_{KN}$ to the sum of the values of the four immediate child nodes of Node$_{KN}$. At block 712, the update handler determines if there are more interior nodes at level K for processing and, if there are more interior nodes of K for processing, execution returns to block 708 and the next node at level K is processed. At block 714, the update handler determines if there are more levels of the quadtree to be processed. If there are more levels of the quadtree to be processed, execution returns to block 706 and the next higher level of the quadtree is processed. If there are no more nodes and no more levels to be processed, execution advances to block 716 where the quadtree data structure is up-to-date, and represents the changed regions of the display screen as indicated by the display capture component.

In an additional implementation, the quadtree can be updated by applying the following changes to the process shown in FIG. 7 may be applied. The update handler initializes the interior nodes and the leaf nodes of the quadtree to zero at block 702. At block 704, when a particular leaf node of the quadtree is set to a value of "1," the value of the parent node of the particular leaf node is incremented. At block 706, the update handler iterates over the levels of the quadtree starting from the level above the leaf nodes to the second level just below the root node. At block 710, the value of node N is added to the value of node N's parent node.

Figure 8:
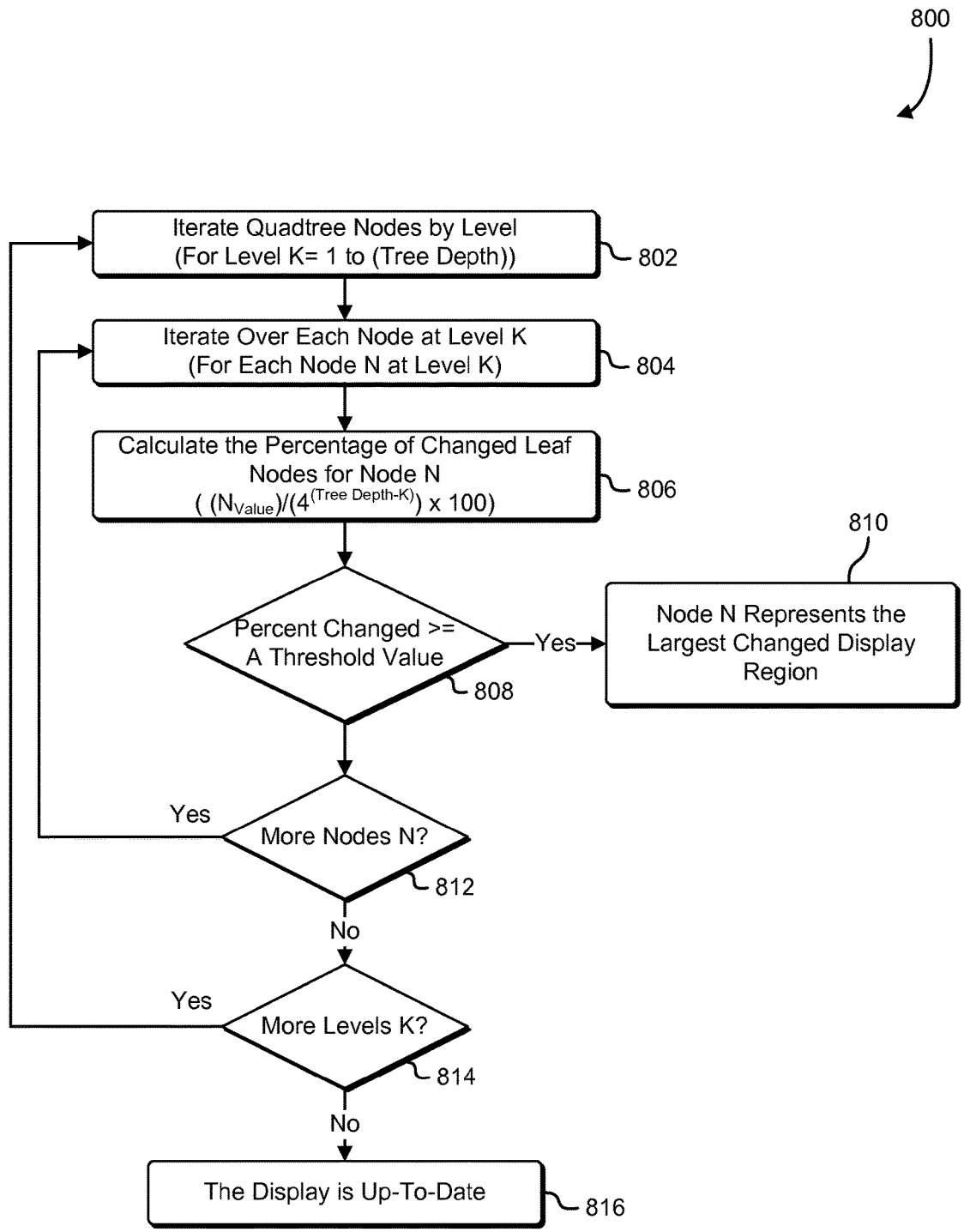
FIG. 8 shows an illustrative example of a process that, when performed by a computer system, identifies a particular quadtree node that represents a region of a display that can be efficiently converted, in accordance with an embodiment.

FIG. 8 shows an illustrative example of a process that, when performed by a computer system, identifies a particular quadtree node that represents a region of a display that can be efficiently converted, in accordance with an embodiment. A process diagram 800 shows a process that can be executed by an update handler to identify a region of a display screen that can be efficiently converted. In various implementations, regions of the display screen are converted using an OpenCL kernel or other technique that processes a group of display pixels efficiently, but imposes a certain amount of overhead time for each application of the technique. As a result, as the size of the region processed using the technique becomes smaller, the effect of the overhead time relative to the pixel-processing time becomes greater, reducing the overall efficiency of the technique. If only a small proportion of the display screen has changed, it is more efficient to convert only the changed portions of the display screen, and reuse portions of a previously-converted display screen image for portions of the display screen that are not changed. The process illustrated in process diagram 800, is one technique for balancing the above factors to identify inefficient regions of a display screen for conversion. Other techniques may be used which are adapted to the characteristics of the updates provided by the display capture component, the graphical processing capabilities accessible to the computer system, and the amount of overhead associated with processing each display region.

In the process illustrated in process diagram 800, the process handler iterates through the nodes of the quadtree by quadtree level starting at the root node of the quadtree down to the leaf nodes of the quadtree. At block 802, the update handler iterates down the levels of the quadtree, using an index of 'K' starting at one (the root node) and incrementing to the depth of the quadtree (the leaf nodes). At block 804, the update handler iterates with an index 'N' through each node of the quadtree at quadtree level 'K'. The loops of block 802 and block 804 identify a particular node of the quadtree that can be designated as Node$_{KN}$.

A potential efficiency of converting the screen region represented by Node$_{KN}$ is determined by examining the proportion of leaf nodes that are descendants, directly or indirectly, of Node$_{KN}$. If the quadtree has been processed as described above in FIG. 7, or updated using another process that records the percentage of descendant nodes that represent changed display regions, the value of Node$_{KN}$ can be used to determine the percentage of leaf nodes of the total leaf nodes under Node$_{KN}$ that have changed. In one example, the percentage of changed leaf nodes can be expressed by:

$$\frac{\text{Value of } NodeKN}{4^{(Quadtree\ Depth-K)}} * 100$$

At block 808, the update handler compares the percentage of changed leaf nodes to a threshold value. The threshold value represents a minimum percentage of changed leaf nodes of the total leaf nodes which are children of the candidate region represented by Node$_{KN}$. In some implementations, the threshold value is 100%. In other implementations, the threshold value is a constant percentage for all levels of the quadtree such as 75%. In yet another implementation, the threshold value is calculated based at least in part on the level of the node in the quadtree. In one example, a table contains a number of threshold values and the index to the table is a level of the quadtree. The threshold value for Node$_{KN}$ is determined by extracting a value from the table at index 'K'. An example of a threshold values table is shown below:

| Quadtree Level | Minimum Percentage of Changed Child Nodes for Efficient Processing |
|---|---|
| 1 | 87 |
| 2 | 75 |
| 3 | 75 |
| 4 | 100 |

In yet another implementation, the threshold value is calculated based at least in part on the performance measures associated with the processing facilities that are accessible to the computer system. If the percentage of changed leaf nodes is greater than or equal to the threshold value, execution proceeds to block 810 and Node$_{KN}$ is identified as a node of the quadtree that represents a region of the display screen which can be efficiently converted. In various implementations, the identified node is returned to a calling function where the region associated with the identified node is converted or otherwise processed. If the percentage of changed leaf nodes is not greater than or equal to the threshold value, execution proceeds to block 812. At block 812, the update handler determines whether there are additional nodes of the quadtree at level 'K'. If there are additional nodes of the quadtree at level 'K', execution returns to block 804 and the next node at level 'K' is examined. If there are not additional nodes of the quadtree at level 'K', the update handler proceeds to block 814. At block 814, the update handler determines whether there are additional levels of the quadtree to be processed. If there are additional levels of the quadtree to be processed, execution returns to block 802 and the next lower level of the quadtree is processed. If there are no additional levels of the quadtree to be processed, execution proceeds to block 816.

At block 816, all nodes of the quadtree have been examined and none of the nodes have been determined to be efficiently convertible. In one example, this can occur when there are no regions of the display that have been changed and require conversion. In another example, this can occur when the threshold value for the leaf node level of the quadtree is less than 100%. When the threshold value for the leaf node level of the quadtree is less than 100%, small regions of the display screen that cannot be combined with additional regions of the display screen under a common parent node to form an efficiently convertible region will not be converted until additional changes have been made to the display that cause the isolated regions to be efficiently convertible. In various implementations, additional techniques are employed to convert the regions of the display screen that have been found to be not efficiently convertible using a particular technique. For example, hand-tuned C++ code that does not rely on a parallel processing framework may, in some situations, impose less overhead when updating small regions of the display. When a particular region of the display is identified as not efficiently convertible using an OpenCL kernel, the update handler can cause the hand-tuned C++ code to be executed to update the identified region of the display.

Figure 9:
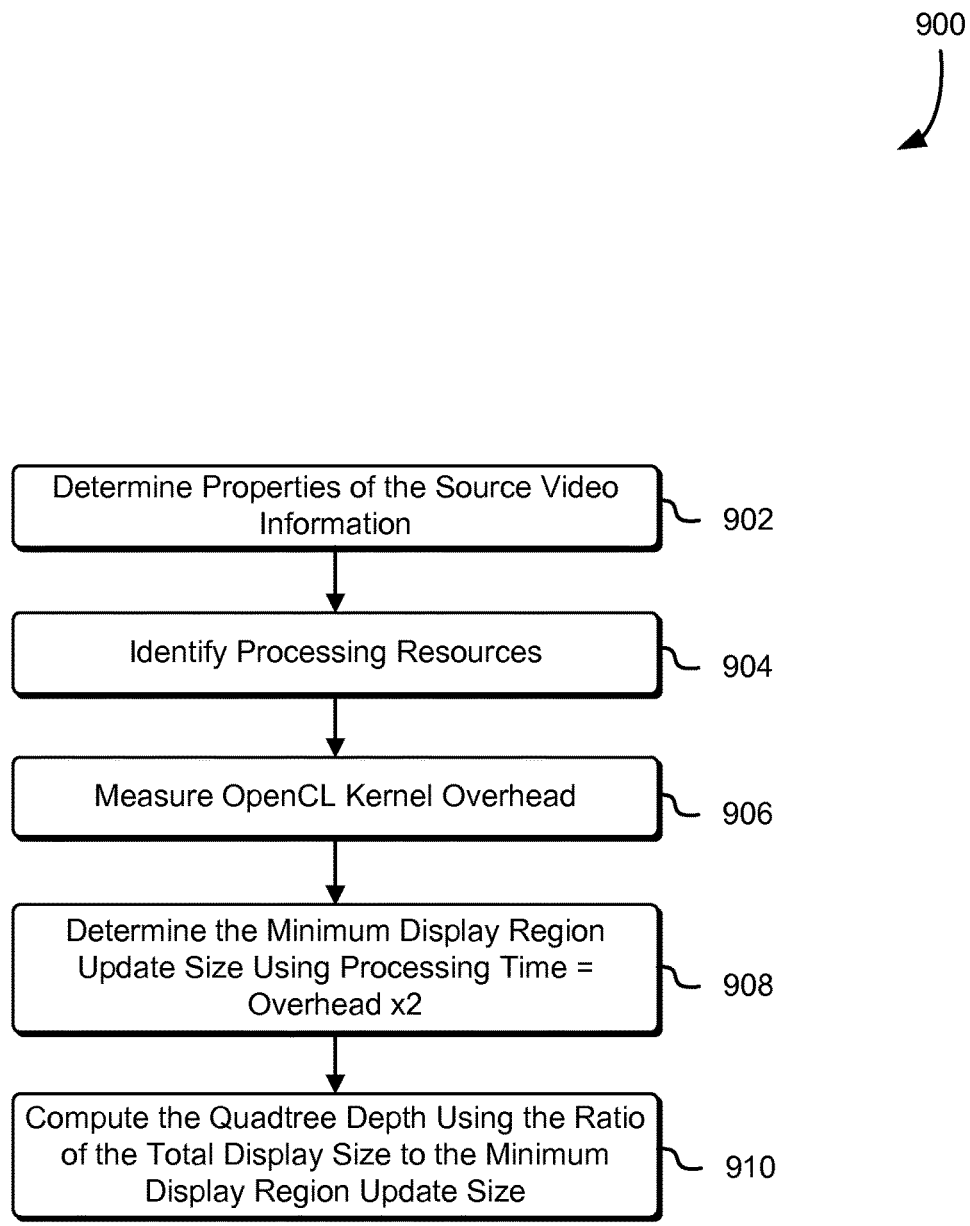
FIG. 9 shows an illustrative example of a process that, when performed by a computer system, determines a tree depth for a quadtree that represents changed areas of the display screen, in accordance with an embodiment.

FIG. 9 shows an illustrative example of a process that, when performed by a computer system, determines a tree depth for a quadtree that represents changed areas of the display screen, in accordance with an embodiment. A process diagram 900 illustrates a process that can be executed by an update handler to identify factors that can be used to dynamically determine a tree depth of the quadtree data structure. At block 902, an update handler determines the properties of the generated video display information such as the resolution and color depth of the display screen. In various implementations, the display screen may support more than one resolution such as 1024×768, 640×480, and 1600×1080. If the display screen supports more than one resolution, the update handler uses the currently used resolution of the display screen to determine the depth of the quadtree. In various implementations, color depth combinations such as 16 or 32 bit color depth preserve memory alignment and can be more efficiently processed, allowing for a lower quadtree depth. At block 904, the update handler identifies the processing facilities available to the computer system. In some implementations, OpenCL provides processor heuristics that indicate a level of performance for an available CPU. In some examples, the update handler identifies instruction sets that are supported by the available CPU.

In some implementations, the depth of the quadtree is dependent on the vector processing capabilities of the CPU. In one example, OpenCL determines a preferred vector width at which the CPU can perform operations, and the kernel is adjusted based on the preferred vector width. The quadtree depth is adjusted so that processing the display regions represented by the leaf nodes of the quadtree can be can be accomplished without starving or overloading the vector processing capabilities of the CPU.

At block 906, the update handler determines the operational overhead of an OpenCL kernel. The operational overhead of the OpenCL kernel can be determined by launching the OpenCL kernel for two different sized regions of the display screen, measuring the time for each instance to complete, and calculating the overhead associated with each launching event. For example, if the time for processing a given number of screen pixels is linearly dependent on the number of screen pixels, and a 10 k block of pixels is processed using the OpenCL kernel in 12 ms, and a 20 k block of pixels is processed using the OpenCL kernel in 22 ms, the overhead time associated with each use of the OpenCL kernel is approximately 2 ms.

Using the information determined at block 906, the update handler determines 908 a minimum display region size that results in a net improvement in throughput with the determined operational overhead. In some implementations, the minimum display region size is determined by determining a region size that can be processed in a time equal to twice the determined operational overhead. For example, when the operational overhead is 2 ms, the minimum region size can be converted by the OpenCL kernel in 4 ms. As a result of determining a minimum region size, the quadtree depth is determined at 910 by measuring the ratio of the minimum region size to the total display screen size. The quadtree depth is determined by taking the fourth root of the ratio of total display screen size to the minimum region size, and rounding up to the next higher integer.

Figure 10:
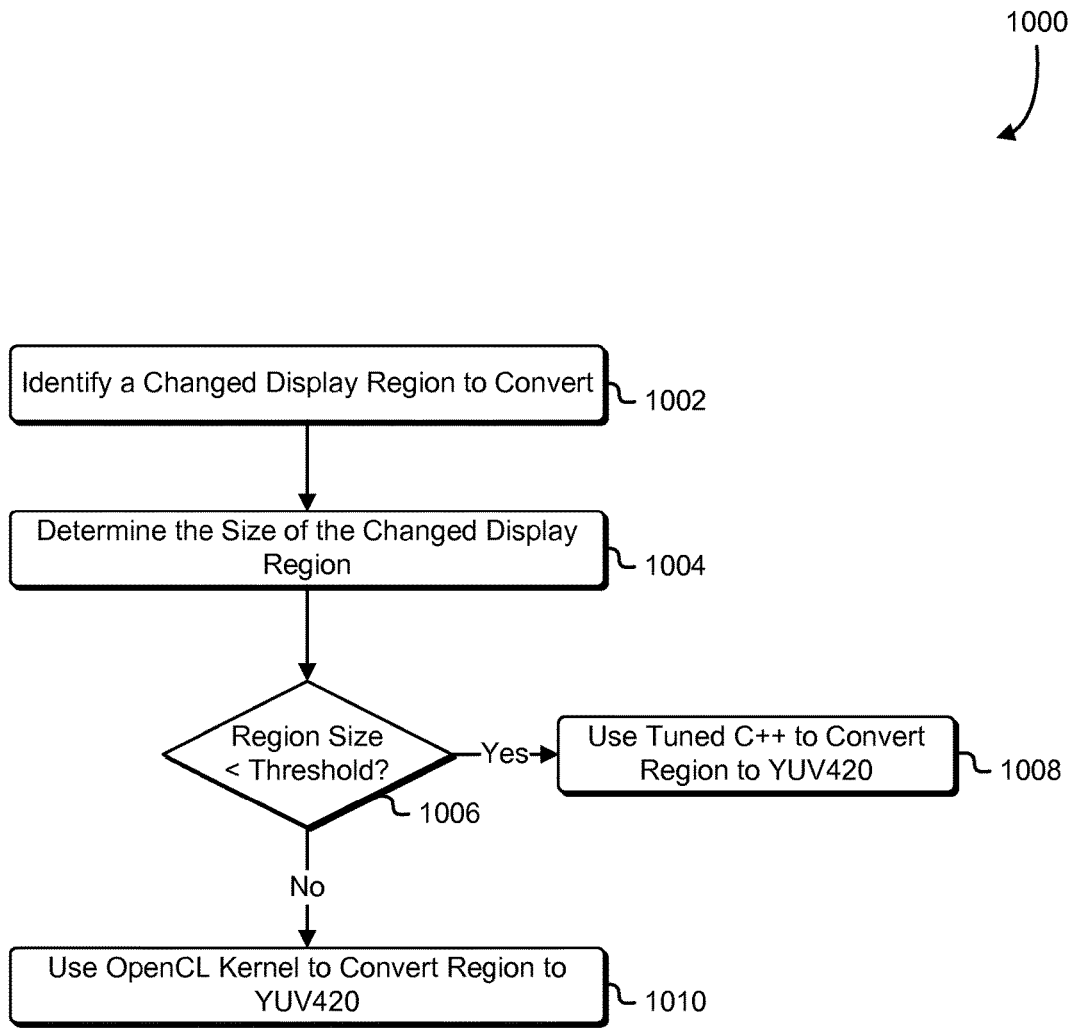
FIG. 10 shows an illustrative example of a process that, when performed by a computer system, determines a process for converting a changed portion of a display screen, in accordance with an embodiment.

FIG. 10 shows an illustrative example of a process that, when performed by a computer system, determine a process for converting a changed portion of a display screen, in accordance with an embodiment. A process diagram 1000 shows a process that can be executed by host components to select a particular technique from a number of supported techniques based at least in part on the size of the region being processed. At block 1002, the host component identifies a region of a display screen to be processed. The size of the identified region is determined 1004 by the host component. At decision block 1006, if the host component determines that the size of the identified region is less than a threshold size, the host component causes the identified region to be processed using low-overhead hand-tuned C++ code that does not rely on a parallel processing framework such as OpenCL. If the host component determines that the size of the identified region is greater than or equal to a threshold size, the host component causes the identified region to be processed using an OpenCL kernel. In some implementations, by using an OpenCL kernel additional overhead associated with launching the OpenCL kernel is incurred, but the incremental performance of the conversion process is enhanced. The threshold size is determined so that smaller regions for which the overhead that is associated with the use of an OpenCL kernel would result in a net performance loss, are converted using lower-overhead C++ code. In some implementations, more than two conversion techniques may be employed.

Figure 11:
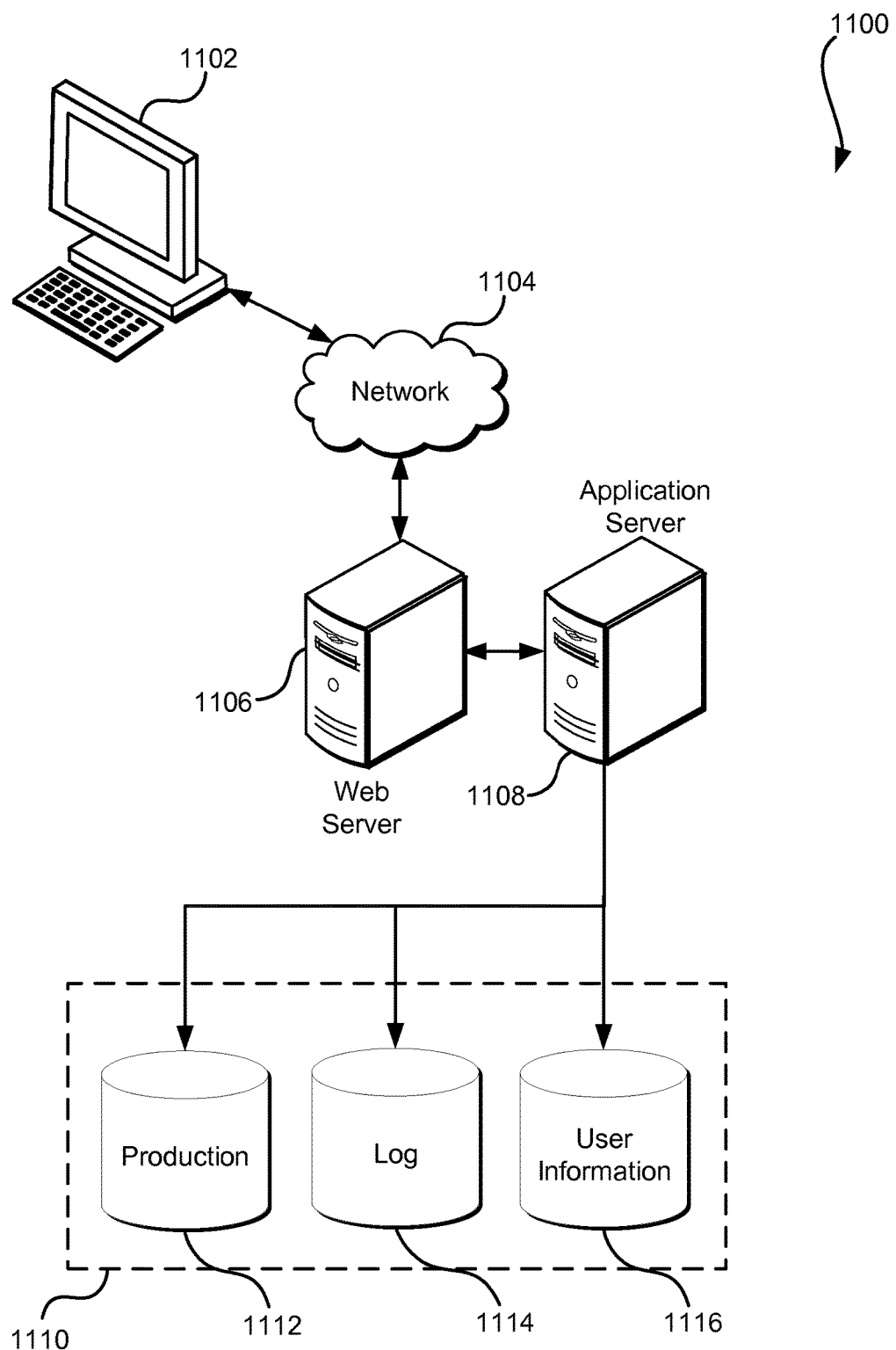
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Further, in some examples, computer systems are configured to implement one or more services that collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
providing a quadtree structure with a collection of interior nodes and a collection of leaf nodes, the quadtree structure having a particular depth, individual interior nodes of the collection of interior nodes individually having four immediate child nodes, and individual leaf nodes of the collection of leaf nodes representing a respective region of a display screen associated with a virtual machine;
receiving from a display capture component hosted by the virtual machine, one or more notifications that indicate one or more changed regions of the display screen;
identifying a subset of the collection of leaf nodes that represent the one or more changed regions of the display screen;
for each individual leaf node in the subset of the collection of leaf nodes, updating the individual leaf node to indicate that the individual leaf node's respective region of the display screen has changed;

for each individual interior node in the collection of interior nodes, updating the individual interior node to a value based at least in part on the values of the child nodes of the individual interior node;
identifying a convertible region of the display screen based at least in part on information in the quadtree structure; and
executing an OpenCL kernel to convert display information of the convertible region of the display screen.

2. The computer-implemented method of claim 1 further comprising:
updating the information in the quadtree structure based at least in part on the convertible region;
identifying an additional convertible region of the display screen based at least in part on the updated information in the quadtree structure; and
executing an OpenCL kernel to convert display information of the additional convertible region of the display screen.

3. The computer-implemented method of claim 1, wherein identifying a convertible region of the display screen is accomplished by at least in part identifying a particular node of the quadtree that represents the largest region of the display screen for which all leaf nodes that descend from the particular node represent a changed region of the display screen.

4. The computer-implemented method of claim 1 further comprising:
providing, at run time from an executing application, OpenCL source code to an OpenCL compiler; and
causing the OpenCL source code to be compiled to create an OpenCL kernel.

5. A system comprising a computing device configured to generate a video stream, wherein the video stream is generated by:
changing a portion of video information of a display screen associated with a virtual machine, the video information encoded in accordance with a first color space;
identifying regions of the display screen based at least in part on the changed portion of the video information using one or more notifications provided by a display capture component hosted by the virtual machine;
generating a tree data structure that maintains information related to the identified regions of the display screen;
identifying a convertible portion of the video information based at least in part on the information maintained in the tree data structure; and
converting the convertible portion of the video information from the first color space to a second color space by using an OpenCL kernel to execute parallel-processing instructions.

6. The system of claim 5, wherein the tree data structure is a quadtree of a particular depth, the particular depth being determined based at least in part on a resolution of the display screen.

7. The system of claim 5, wherein:
the tree data structure is a quadtree of a particular depth;
the particular depth is determined based at least in part on an amount of overhead time that is associated with converting video information; and
the amount of overhead time is measured by performing two conversion operations on two different-sized regions of the display screen.

8. The system of claim 5, wherein:
the tree data structure has a particular depth; and
the particular depth is determined at runtime using a table of tree depths, the table of tree depths being indexed using a resolution of the display screen and a color depth of the display screen.

9. The system of claim 5, wherein the video stream is generated by further:
determining a size of the convertible portion of the video information;
determining that the size is smaller than a threshold size; and
as a result of determining that the size is less than the threshold size, converting the convertible portion of the video information without using parallel processing instructions.

10. The system of claim 5, wherein identifying a convertible portion of the video information is accomplished at least in part by identifying a particular node in the tree data structure that is closest to a root node of the tree data structure where at least a threshold percentage of descendant leaf nodes of the particular node are associated with regions of the display screen that have changed.

11. The system of claim 5, wherein the computing device transmits a final video stream to a remote display device, the final video stream including the converted convertible portion of the video information.

12. The system of claim 5, wherein:
the computing device is a virtual machine that is supported by a hypervisor; and
the parallel processing instructions are instructions that are passed by the hypervisor to a physical processor that is accessible to the hypervisor.

13. A non-transitory computer-readable storage medium having stored thereon executable instructions that, when executed by one or more processors of a computer system, cause the computer system to at least:
access display information produced by a virtual machine, the display information associated with a display screen of the virtual machine and, the display information in accordance with a first format;
receive, from a display capture component running on the virtual machine, a notification that identifies a region of the display screen for which the associated display information has changed;
maintain a tree data structure having a set of nodes that represent various regions of the display screen, and which have values based at least in part on the region of the display screen for which the associated display information has changed;
determine a portion of the display information to be converted based at least in part on information maintained in the tree data structure; and
convert the portion of the display information from the first format to a second format using a parallel processing kernel.

14. The non-transitory computer-readable storage medium of claim 13, wherein the instructions further comprise instructions that, when executed by the one or more processors, cause the computer system to store, in a file on a computer-readable data storage device, the converted portion of the display information in the second format.

15. The non-transitory computer-readable storage medium of claim 13, wherein the instructions that cause the computer system to convert the portion of the display information from the first format to the second format further include single-instruction-multiple-data instructions or multiple-instruction-multiple-data instructions.

16. The non-transitory computer-readable storage medium of claim 13, wherein the instructions further comprise instructions that, when executed by the one or more processors, cause the computer system to measure a performance characteristic of a processor that is accessible to the computer system, and wherein the tree data structure has a particular depth that is determined based at least in part on the value of the measured performance characteristic.

17. The non-transitory computer-readable storage medium of claim 13, wherein:
the notification that identifies the region of the display screen is generated by a display capture component; and
the display capture component provides access to a memory region that contains the display information.

18. The non-transitory computer-readable storage medium of claim 13 wherein:
the first format is in accordance with a BGR(A) color space; and
the second format is in accordance with a YUV420 color space.

19. The non-transitory computer-readable storage medium of claim 13, wherein the instructions that cause the computer system to determine a portion of the display information to be converted further include instructions configured to identify a region of the display screen that is represented in the tree data structure with a collection of nodes, at least a threshold percentage of nodes in the collection of nodes representing regions of the display screen that have changed.

20. The non-transitory computer-readable storage medium of claim 13, wherein:
the instructions include instructions defined in a parallel processing instruction set; and
the one or more processors include at least one processor that is configured to execute the instructions defined in the parallel processing instruction set.

21. The computer-implemented method of claim 1, wherein the display information is converted from a first format to a second format using parallel processing instructions that are not executed on a graphics processing unit.

22. The system of claim 5, wherein converting the convertible portion of the video information from the first color space to a second color space is accomplished at least in part by using an OpenCL kernel to execute parallel-processing instructions without the support of a graphics processing unit.

23. The non-transitory computer-readable medium of claim 13 wherein the instructions that convert the portion of the display information from the first format to the second format execute a parallel processing kernel without the assistance of a graphics processing unit.

* * * * *

UNITED STATES PATENT AND TRADEMARK OFFICE
CERTIFICATE OF CORRECTION

| | | |
|---|---|---|
| PATENT NO. | : 9,654,753 B1 | Page 1 of 1 |
| APPLICATION NO. | : 14/842757 | |
| DATED | : May 16, 2017 | |
| INVENTOR(S) | : Anantha V. Balasubramaniam | |

It is certified that error appears in the above-identified patent and that said Letters Patent is hereby corrected as shown below:

In the Specification

Column 5, Line 38:
"YUV420, the host components updates the quadtree"
Should read as:
--YUV420, the host components update the quadtree--

Column 6, Line 55:
"user application code includes instructions that, when"
Should read as:
--user application code 310 includes instructions that, when--

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*